(12) United States Patent
Shen et al.

(10) Patent No.: US 7,119,761 B2
(45) Date of Patent: Oct. 10, 2006

(54) PIXEL STRUCTURE

(75) Inventors: Yuh-Ren Shen, Tainan (TW);
Ching-Yih Chen, Miaoli (TW)

(73) Assignee: Chi Mei Optoelectronics Corp., Tainan (TW)

( * ) Notice: Subject to any disclaimer, the term of this patent is extended or adjusted under 35 U.S.C. 154(b) by 367 days.

(21) Appl. No.: 10/761,154

(22) Filed: Jan. 20, 2004

(65) Prior Publication Data
US 2005/0018113 A1    Jan. 27, 2005

(30) Foreign Application Priority Data
Jul. 25, 2003    (TW) .............................. 92120338 A

(51) Int. Cl.
*H01L 25/00* (2006.01)
(52) U.S. Cl. .......................... 345/5; 349/114
(58) Field of Classification Search ................. 345/87, 345/96; 349/77, 114
See application file for complete search history.

(56) References Cited

U.S. PATENT DOCUMENTS

2004/0239846 A1* 12/2004 Wen et al. ................. 349/114

* cited by examiner

*Primary Examiner*—Almis R. Jankus
(74) *Attorney, Agent, or Firm*—Thomas, Kayden, Horstemeyer & Risley

(57) ABSTRACT

A pixel structure of a transflective LCD disposed between a first data line and a second data line. The pixel structure comprises a reflective cell and a transmission cell. The transistor comprises a gate coupled to a scan line, a source coupled to the first data line, and a drain coupled to the first reflective electrode. The first transistor is covered by the first reflective electrode. The transmission cell comprises a second transistor and a transparent electrode. The second transistor comprises a gate coupled to the scan line, a source coupled to the second data line, and a drain coupled to the transparent electrode. The second transistor is covered by a second reflective electrode.

19 Claims, 17 Drawing Sheets

PIXEL STRUCTURE

BACKGROUND OF THE INVENTION

1. Field of the Invention

The invention relates to a pixel structure, and more particularly to a pixel structure of a transflective liquid crystal display (LCD).

2. Description of the Related Art

A pixel structure of a conventional transflective LCD has a reflective cell and a transmission cell. Unavoidably, the reflective cell has nearly double the phase difference of the transmission cell. Reduction of cell gap of the reflective cell to approach that of the transmission cell has been adopted in the past to address this issue. FIG. 9A shows a perspective diagram of a pixel structure of a conventional transflective LCD. The pixel structure includes a reflective cell 10 and a transmission cell 20. The reflective cell 10 has a reflective film 12 and a cell gap d1. The transmission cell 20 has a cell gap d2.

An equivalent circuit is shown in FIG. 9B. The reflective cell 10 and transmission cell 20 are both coupled to a storage capacitor Cs and a TFT (thin-film-transistor) transistor T1. Thus, only one driving voltage can be supplied. The anti-inversion approach provides the cell gaps d1 and d2 with the same phase difference. The cell gaps d1 and d2 must be optimized to fit the LCD's operating mode, an approach that is difficult to adjust.

SUMMARY OF THE INVENTION

The present invention is directed to pixel structure with exact reflection and transmission of transflective LCD.

Accordingly, the present invention provides a pixel structure of transflective LCD disposed between a first data line and a second data line. The pixel structure comprises a reflective cell having a first transistor and a first reflective electrode, and a transmission cell having a second transistor and a transparent electrode. The first transistor comprises a gate coupled to a scan line, a source coupled to the first data line, and a drain coupled to the first reflective electrode, wherein the first transistor is covered by the first reflective electrode. The second transistor comprises a gate coupled to the scan line, a source coupled to the second data line, and a drain coupled to the transparent electrode, wherein the second transistor is covered by a second reflective electrode.

BRIEF DESCRIPTION OF THE DRAWINGS

For a better understanding of the present invention, reference is made to a detailed description to be read in conjunction with the accompanying drawings, in which.

DETAILED DESCRIPTION OF THE INVENTION

Figure 1:
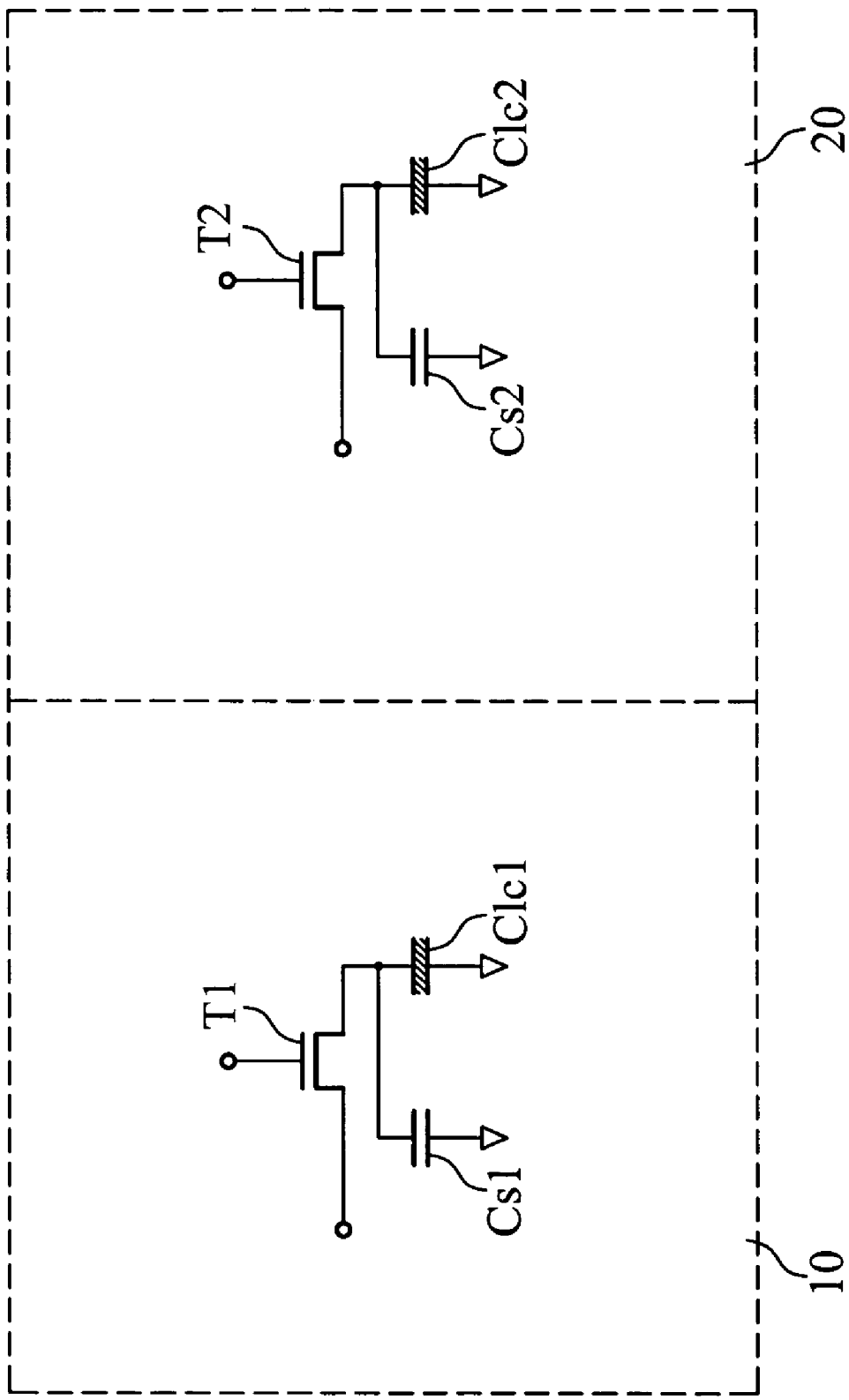
FIG. 1 is an equivalent circuit diagram showing the pixel structure of the present invention.

FIG. 1 is an equivalent circuit diagram showing the pixel structure of the present invention. The pixel structure comprises thin film transistors T1 and T2 and storage capacitors Cs1 and Cs2. The thin film transistors T1 and T2 control drive voltages of a reflective cell 10 and a transmission cell 20 respectively. The phase differences of the reflective cell 10 and transmission cell 20 are normalized by adjusting the gamma correction curves but cell gaps, and reflection and transmission of the LCD are exact.

First Embodiment

Figure 2A:
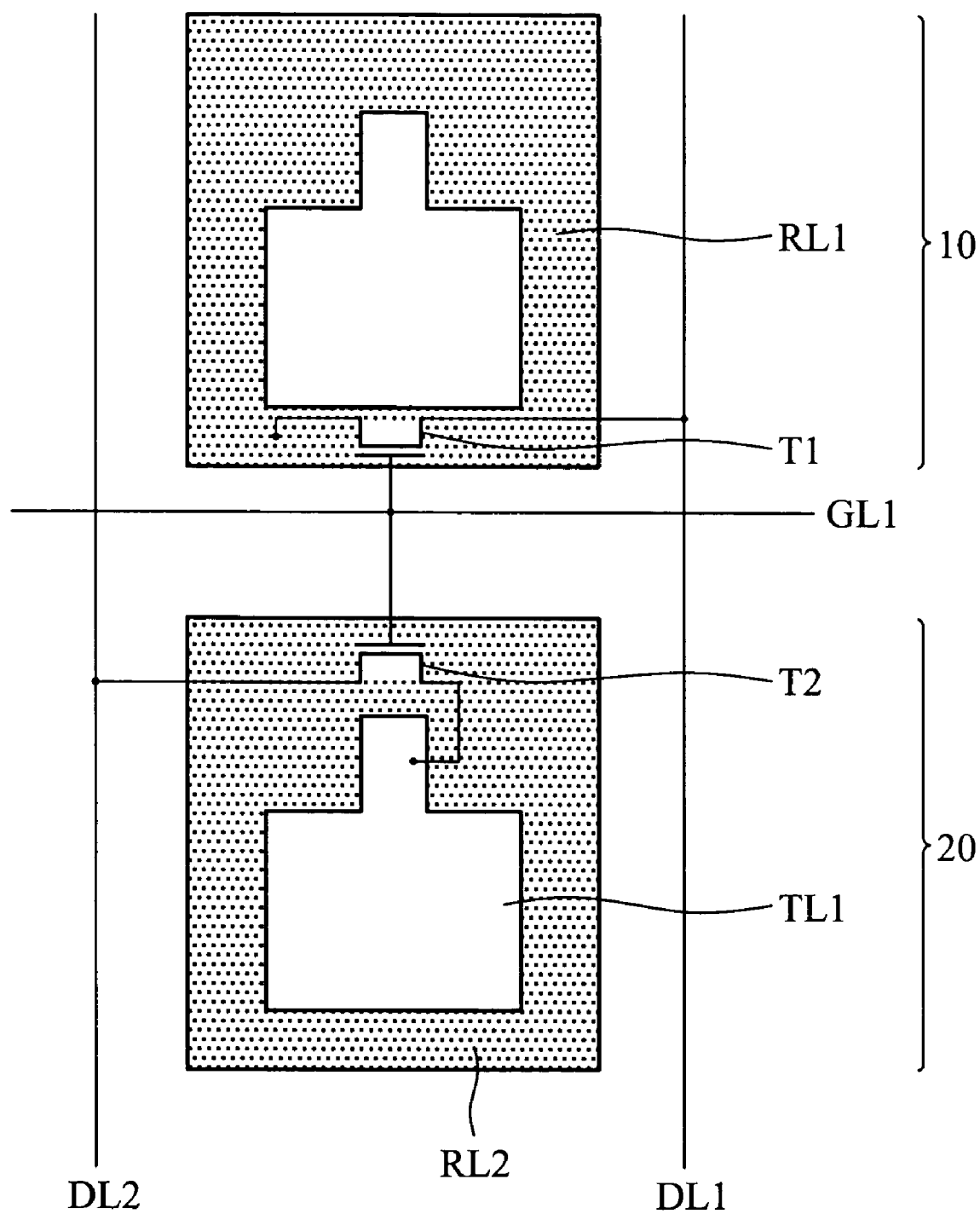
FIG. 2A is a schematic diagram showing the pixel structure of the present invention.
Figure 2B:
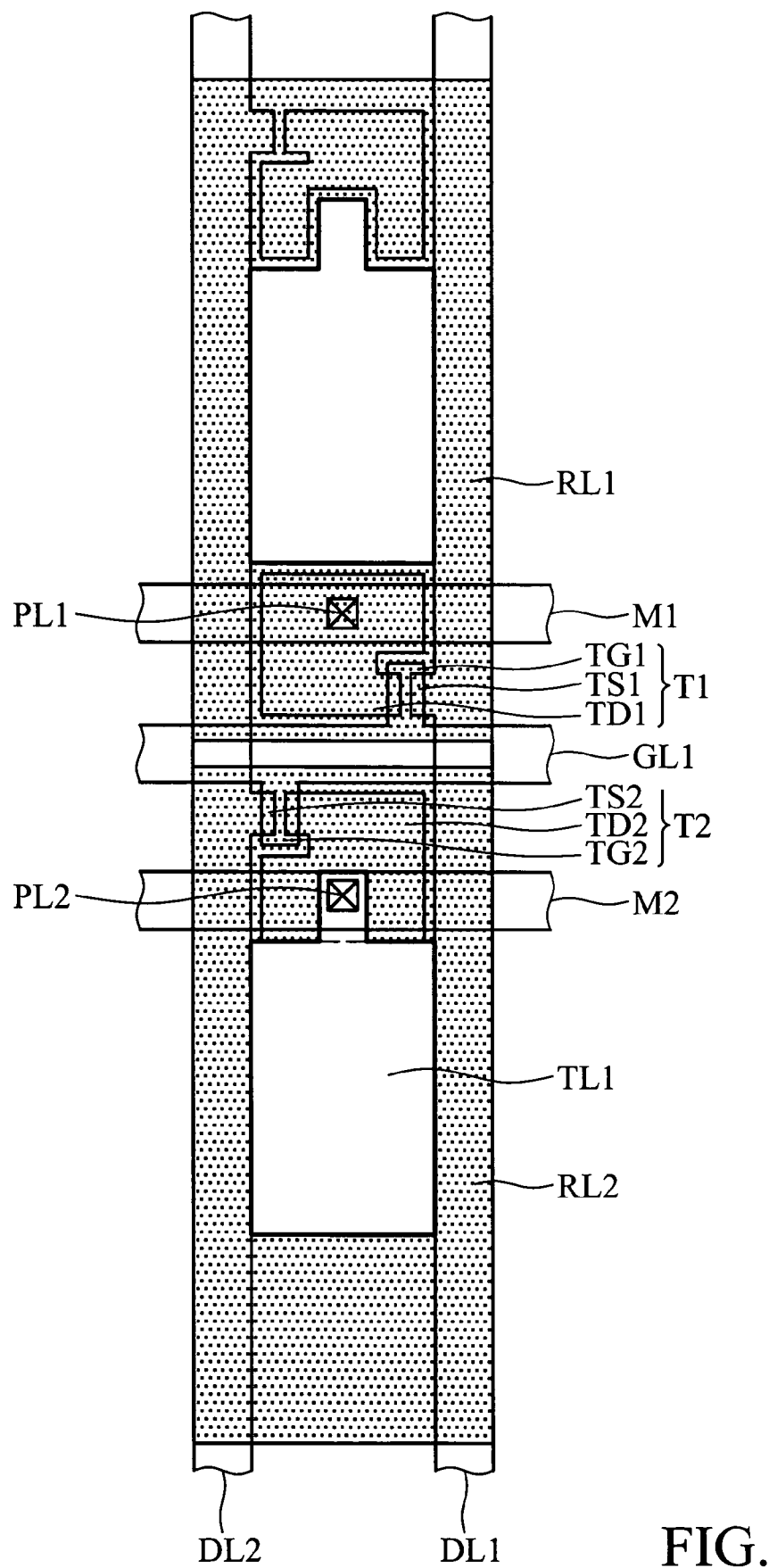
FIG. 2B is a layout of FIG. 2A.

FIG. 2A is a schematic diagram showing the pixel structure of the present invention, and FIG. 2B is a layout of FIG. 2A. The pixel structure having a reflective cell 10 and a transmission cell 20 is disposed between a first data line DL1 and a second data line DL2, the reflective cell 10 comprises a transistor T1 and a reflective electrode RL1, and the transmission cell 20 comprises a transistor T2 and a transparent electrode TL1.

A projection of the first data line DL1 acts as a source TS1 of the transistor T1. A drain TD1 of the transistor T1 is coupled to the reflective electrode RL1 by a plug PL1. A projection of the data line DL2 acts as a source TS2 of the transistor T2. A drain of the transistor T2 is coupled to the transparent electrode TL1 by a plug PL2. Two projections of a scan line act as gates TG1 and TG2 of the transistors T1 and T2 respectively.

The transistor T1 is covered by the reflective electrode RL1, and the transistor T2 is covered by a reflective electrode RL2 of another pixel structure. The transparent electrode TL1 is on the center of the reflective electrode RL2. Metal layers M1 and M2, acting as storage capacitors, are disposed under the plugs PL1 and PL2 respectively. In this invention, the transparent electrode TL1 can be formed by Indium Tin Oxide (ITO).

Second Embodiment

Figure 3A:
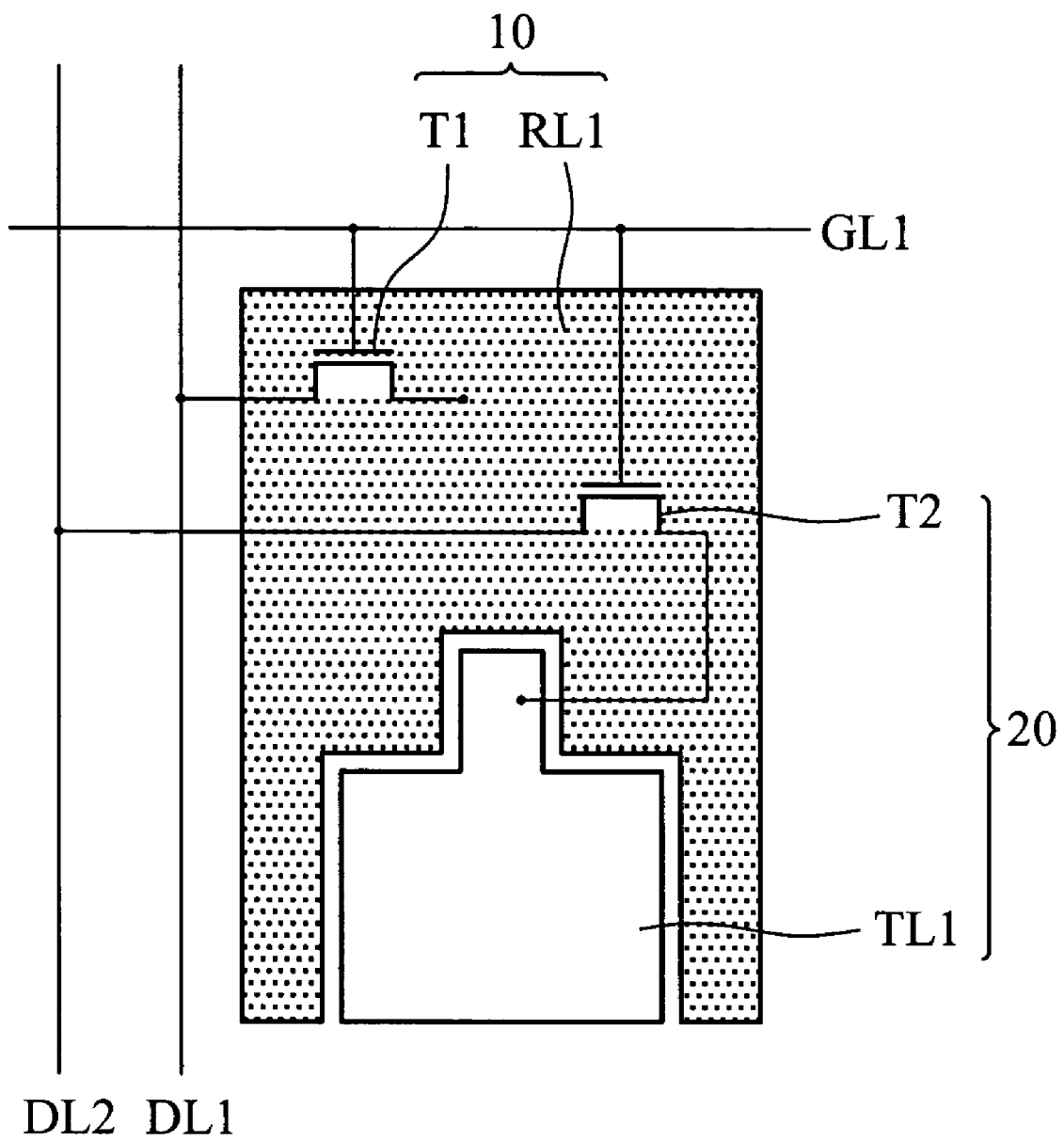
FIG. 3A is a schematic diagram showing another pixel structure of the present invention.
Figure 3B:
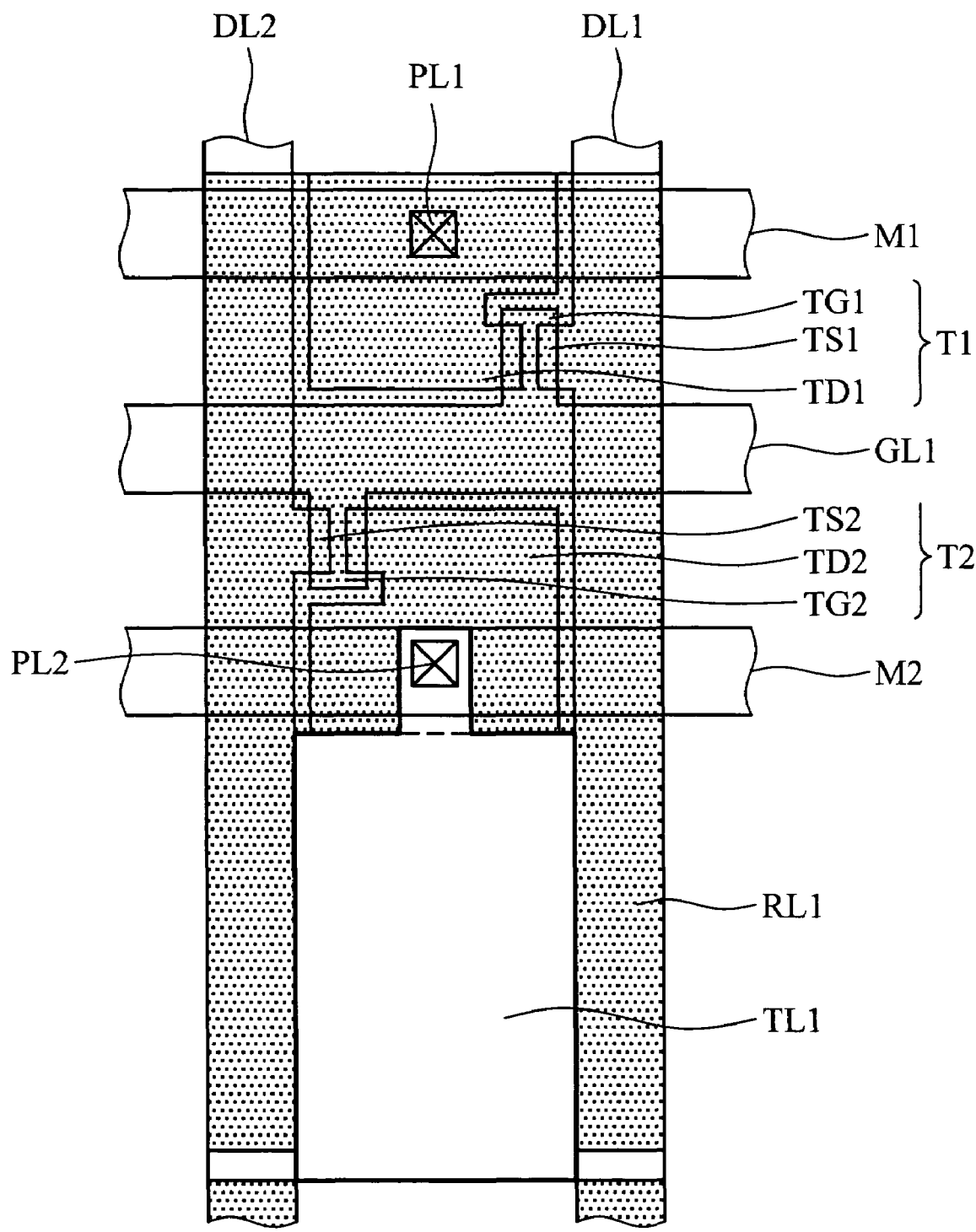
FIG. 3B is a layout of FIG. 3A.

FIG. 3A is a schematic diagram showing another pixel structure of the present invention, and FIG. 3B is a layout of FIG. 3A. The pixel structure having a reflective cell 10 and a transmission cell 20 is disposed between a first data line DL1 and a second data line DL2, the reflective cell 10 having a transistor T1 and a reflective electrode RL1, and the transmission cell 20 comprises a transistor T2 and a transparent electrode TL1.

The first data line DL1 has a projection acting as a source TS1 of the transistor T1. A drain TD1 of the transistor T1 is coupled to the reflective electrode RL1 by a plug PL1. A projection of the data line DL2 acts as a source TS2 of the transistor T2. A drain of the transistor T2 is coupled to the transparent electrode TL1 by a plug PL2. Two projections of a scan line act as gates TG1 and TG2 of the transistors T1 and T2 respectively.

Transistors T1 and T2 are covered by the reflective electrode RL1, and disposed on the reverse side of the transparent electrode TL1. Metal layers M1 and M2, acting as storage capacitors, are disposed under the plug PL1 and PL2 respectively.

Figure 3C:
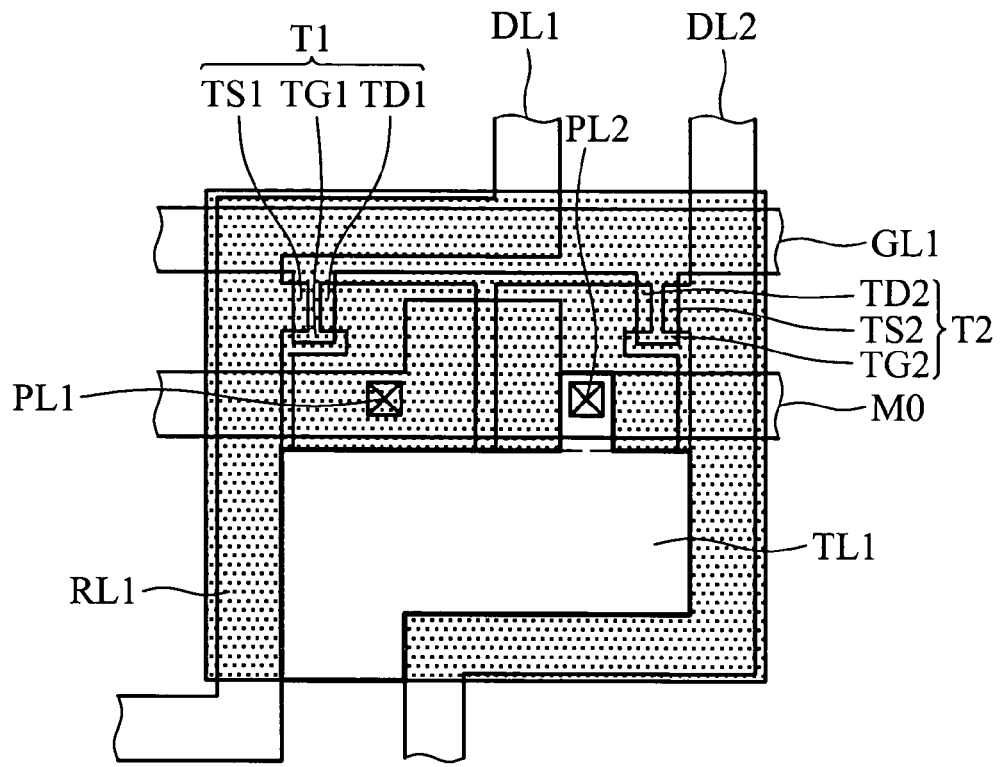
FIG. 3C shows another configuration of FIG. 3A.
Figure 3D:
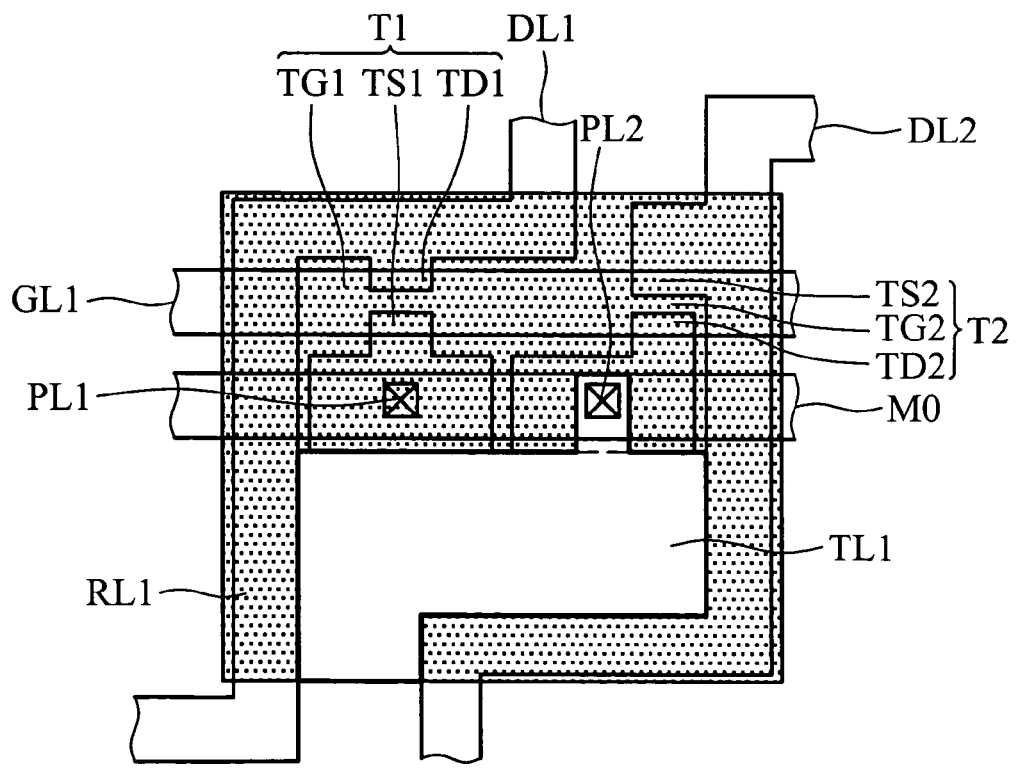
FIG. 3D shows another configuration of FIG. 3A.

FIGS. 3C and 3D show other configurations of the embodiment. The pixel structure having a reflective cell 10 and a transmission cell 20 is disposed between a first data line DL1 and a second data line DL2.

The reflective cell 10 comprises a transistor T1 and a reflective electrode RL1, and the transmission cell 20 comprises a transistor T2 and a transparent electrode TL1.

A projection of the first data line DL1 acts as a source TS1 of the transistor T1. A drain TD1 of the transistor T1 is coupled to the reflective electrode RL1 by a plug PL1. A projection of the data line DL2 acts as a source TS2 of the transistor T2. A drain of the transistor T2 is coupled to the transparent electrode TL1 by a plug PL2. Two projections of a scan line act as gates TG1 and TG2 of the transistors T1 and T2 respectively.

The transistor T1 and T2 are covered by the reflective electrode RL1, and disposed on the reverse side of the transparent electrode TL1. A metal layer M0 acting as a storage capacitor is disposed under the drains TD1 and TD2 of the transistors T1 and T2 respectively.

Third Embodiment

Figure 4A:
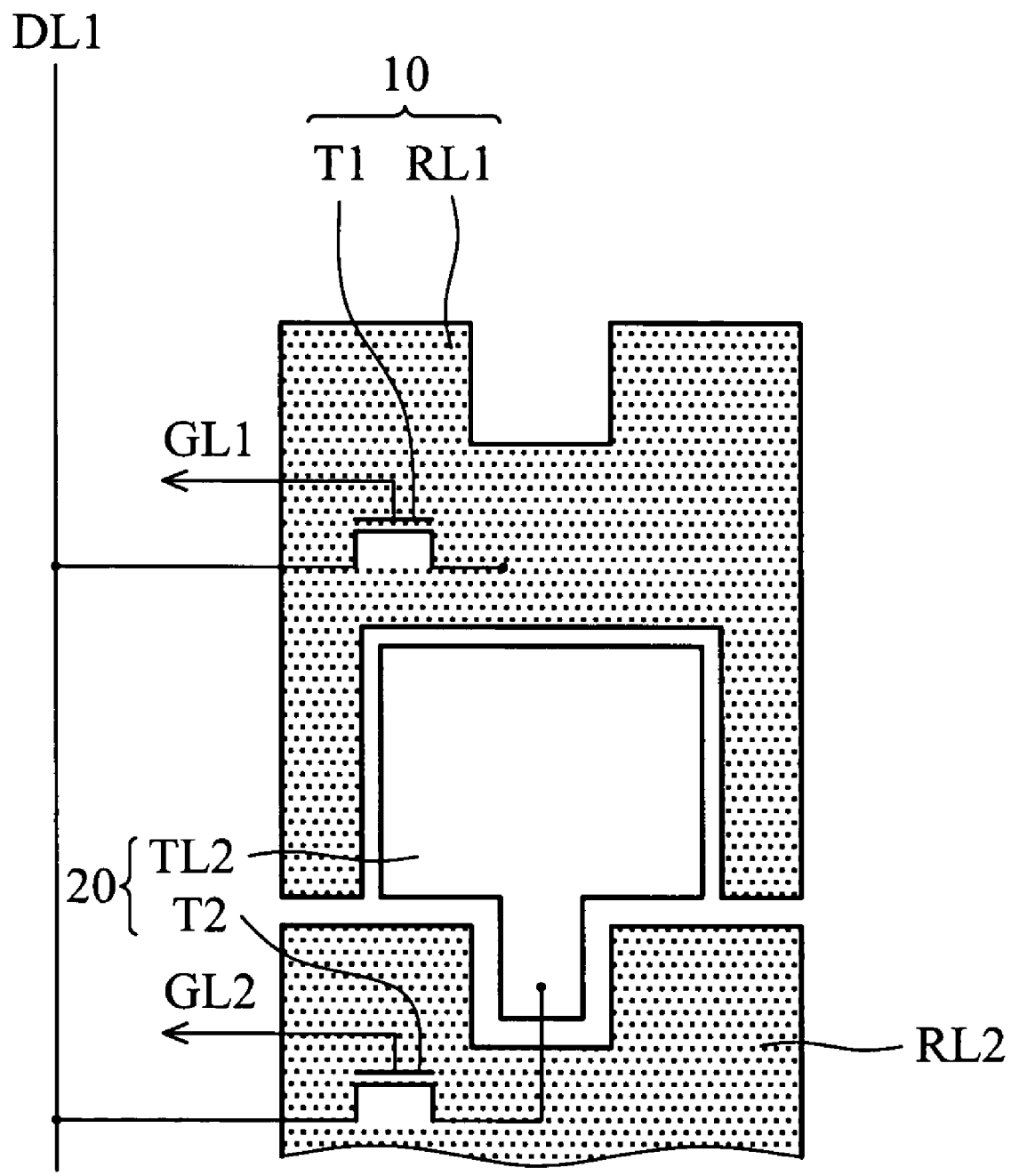
FIG. 4A is a schematic diagram showing another pixel structure of the present invention.
Figure 4B:
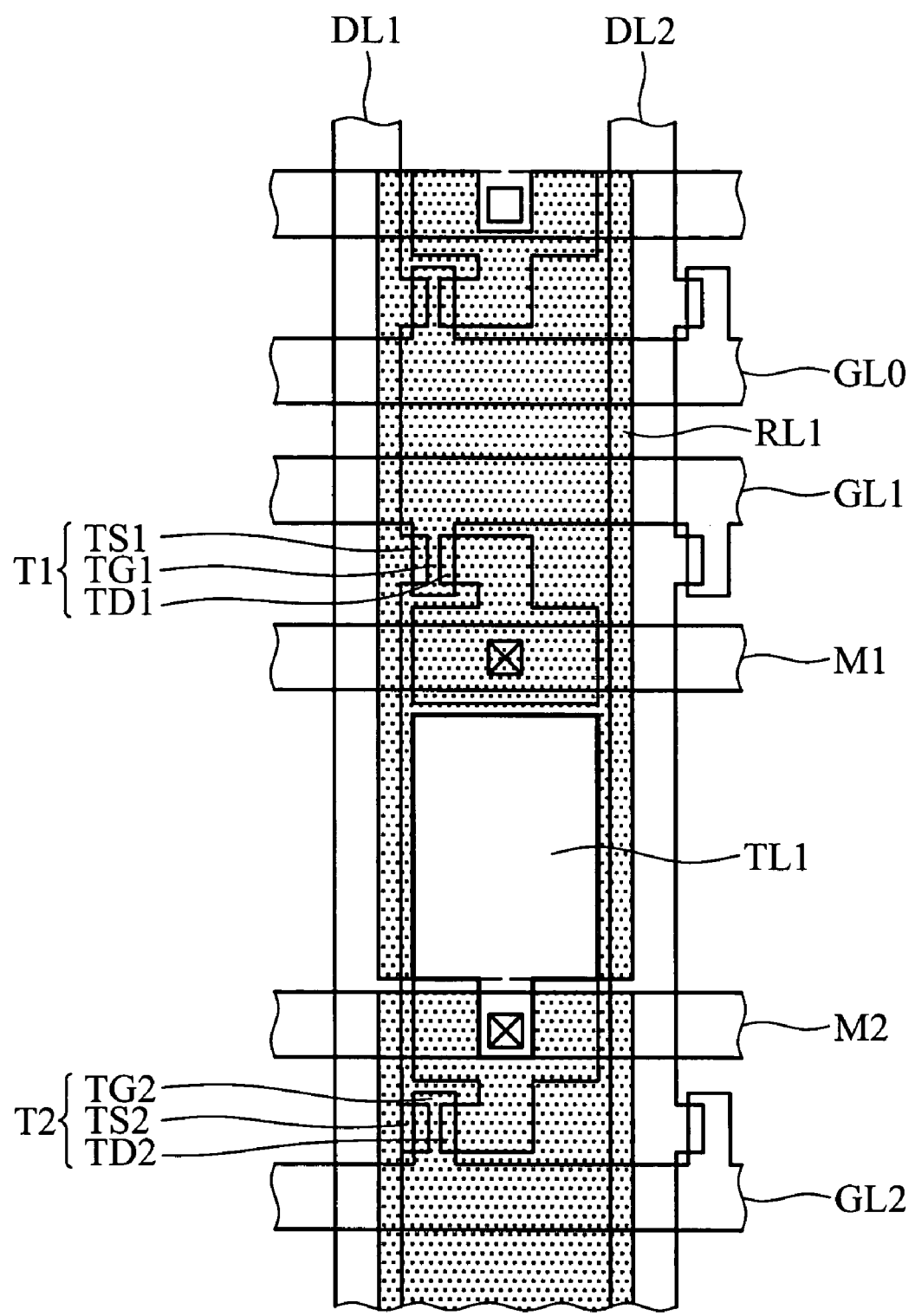
FIG. 4B is a layout of FIG. 4A.

FIG. 4A is a schematic diagram showing another pixel structure of the present invention, and FIG. 4B is a layout of FIG. 4A. The pixel structure having a reflective cell 10 and a transmission cell 20 is disposed between a first data line DL1 and a second data line DL2, the reflective cell 10 comprises a transistor T1 and a reflective electrode RL1, and the transmission cell 20 comprises a transistor T2 and a transparent electrode TL1.

A projection of the scan line GL1 acts as a gate TG1 of the transistor T1. Two projections of the data line DL1 act as sources TS1 and TS2 of the transistors T1 and T2 respectively. A drain TD1 of the transistor T1 is coupled to the reflective electrode RL1 by a plug PL1. A projection of the scan line GL2 acts as a gate TG2 of the transistor T2. A drain TD2 of the transistor T2 is coupled to the transparent electrode TL1 by a plug PL2.

The reflective electrode RL1 covers the transistor T1 and a transistor of another pixel structure, and a reflective electrode RL2 of another pixel structure covers the transistor T2. The transparent electrode TL1 is disposed between the transistor T1 and T2. Metal layers M1 and M2, acting as storage capacitors, are disposed under the plugs PL1 and PL2 respectively.

Fourth Embodiment

Figure 5A:
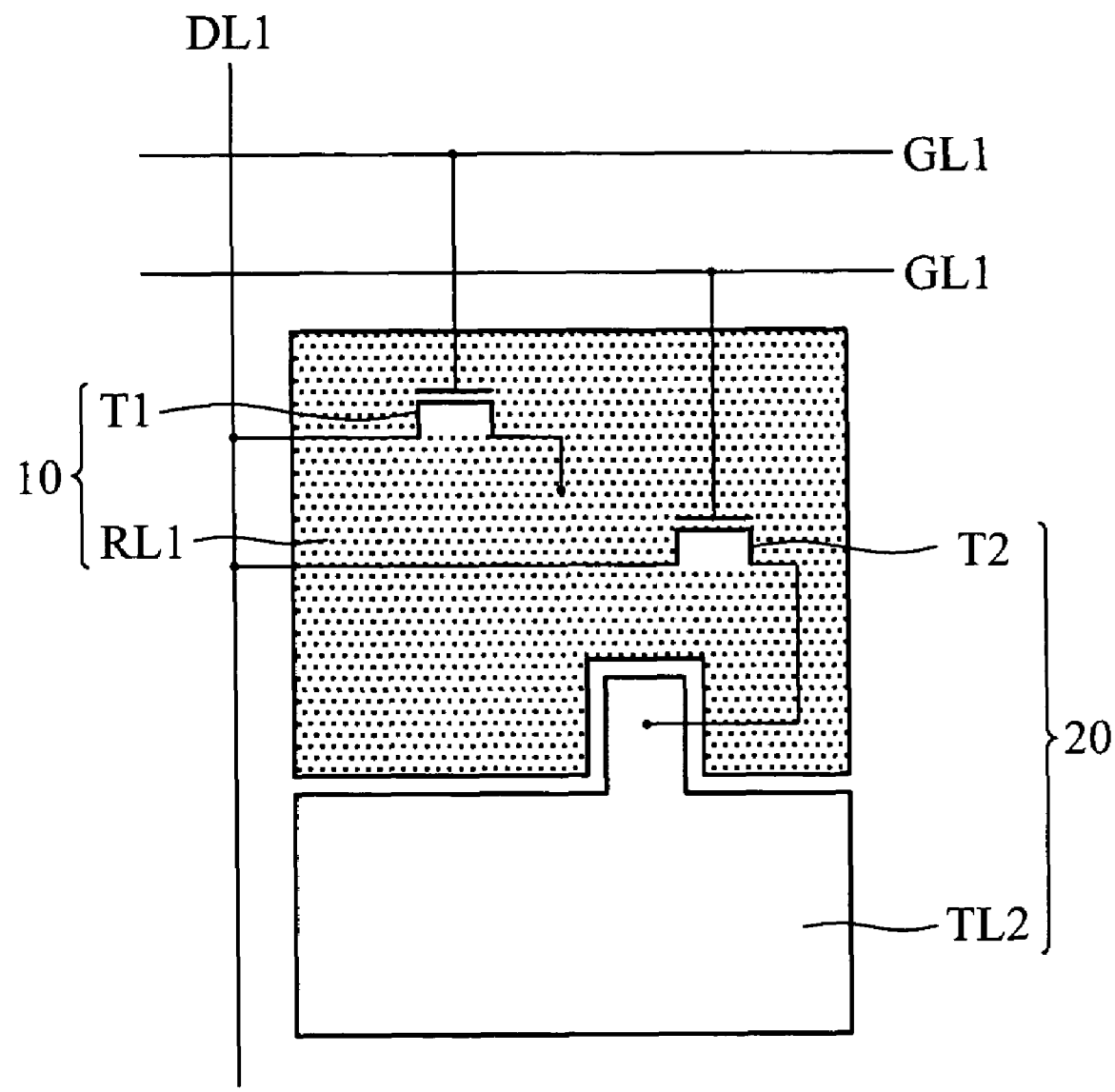
FIG. 5A is a schematic diagram showing another pixel structure of the present invention.
Figure 5B:
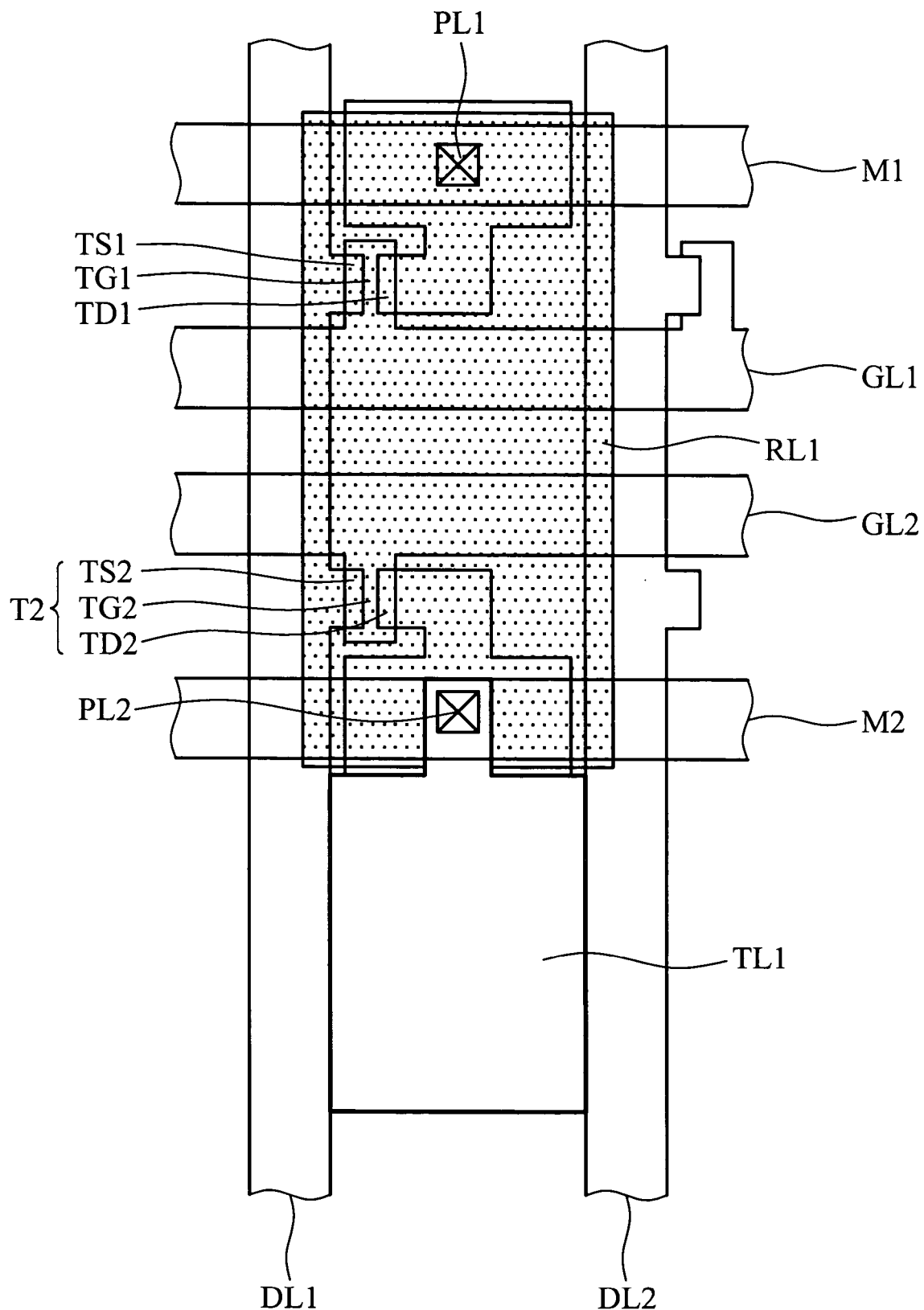
FIG. 5B is a layout of FIG. 5A.

FIG. 5A is a schematic diagram showing another pixel structure of the present invention, and FIG. 5B is a layout of FIG. 5A. The pixel structure having a reflective cell 10 and a transmission cell 20 is disposed between a first data line DL1 and a second data line DL2, the reflective cell 10 comprises a transistor T1 and a reflective electrode RL1, and the transmission cell 20 comprises a transistor T2 and a transparent electrode TL1.

A projection of the scan line GL1 acts as a gate TG1 of the transistor T1. Two projections of the data line DL1 act as sources TS1 and TS2 of the transistors T1 and T2 respectively. A drain TD1 of the transistor T1 is coupled to the reflective electrode RL1 by a plug PL1. A projection of the scan line GL2 acts as a gate TG2 of the transistor T2. A drain TD2 of the transistor T2 is coupled to the transparent electrode TL1 by a plug PL2.

The transistors T1 and T2 are covered by the reflective electrode RL1, and disposed on the reverse side of the transparent electrode TL1. Metal layers M1 and M2, acting as storage capacitors, are disposed under the plugs PL1 and PL2 respectively.

Figure 6A:
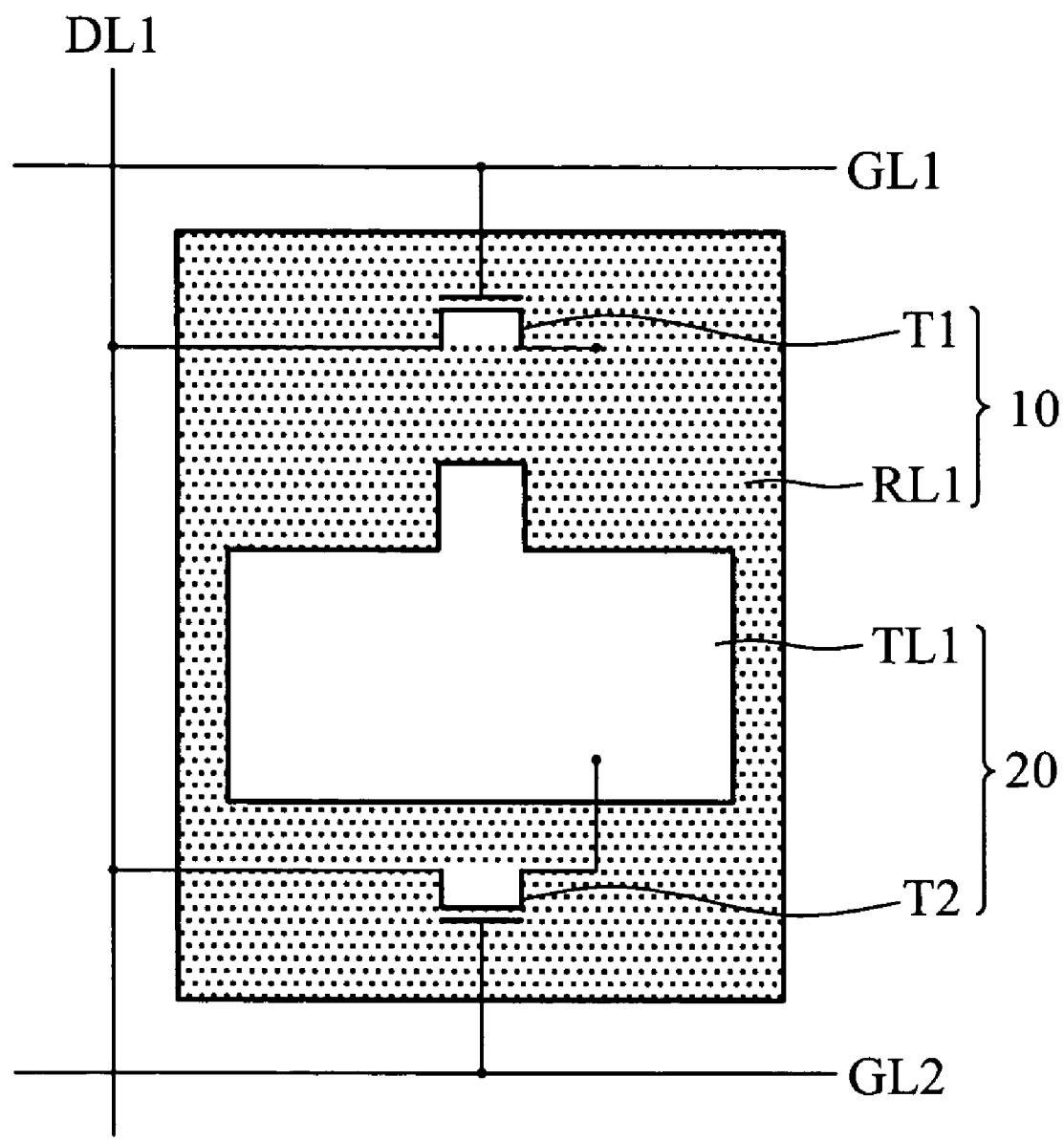
FIG. 6A is a schematic diagram showing another pixel structure of the present invention.
Figure 6B:
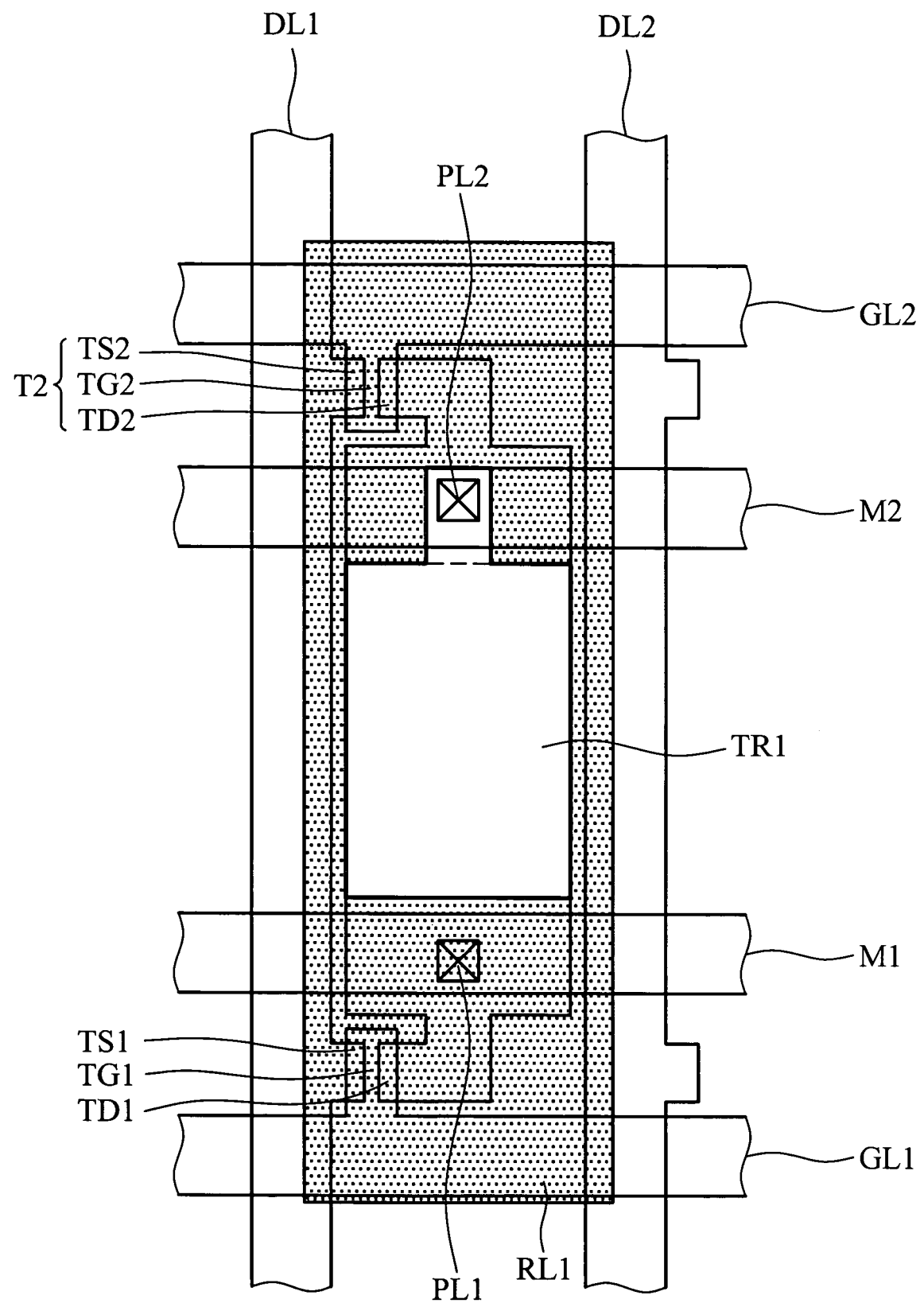
FIG. 6B is a layout of FIG. 6A.

FIGS. 6A and 6B show other configurations of the embodiment. A pixel structure having a reflective cell 10 and a transmission cell 20 is disposed between a first data line DL1 and a second data line DL2. The transistors T1 and T2 are covered by a reflective electrode RL1, and disposed on different sides under the transparent electrode.

Figure 7A:
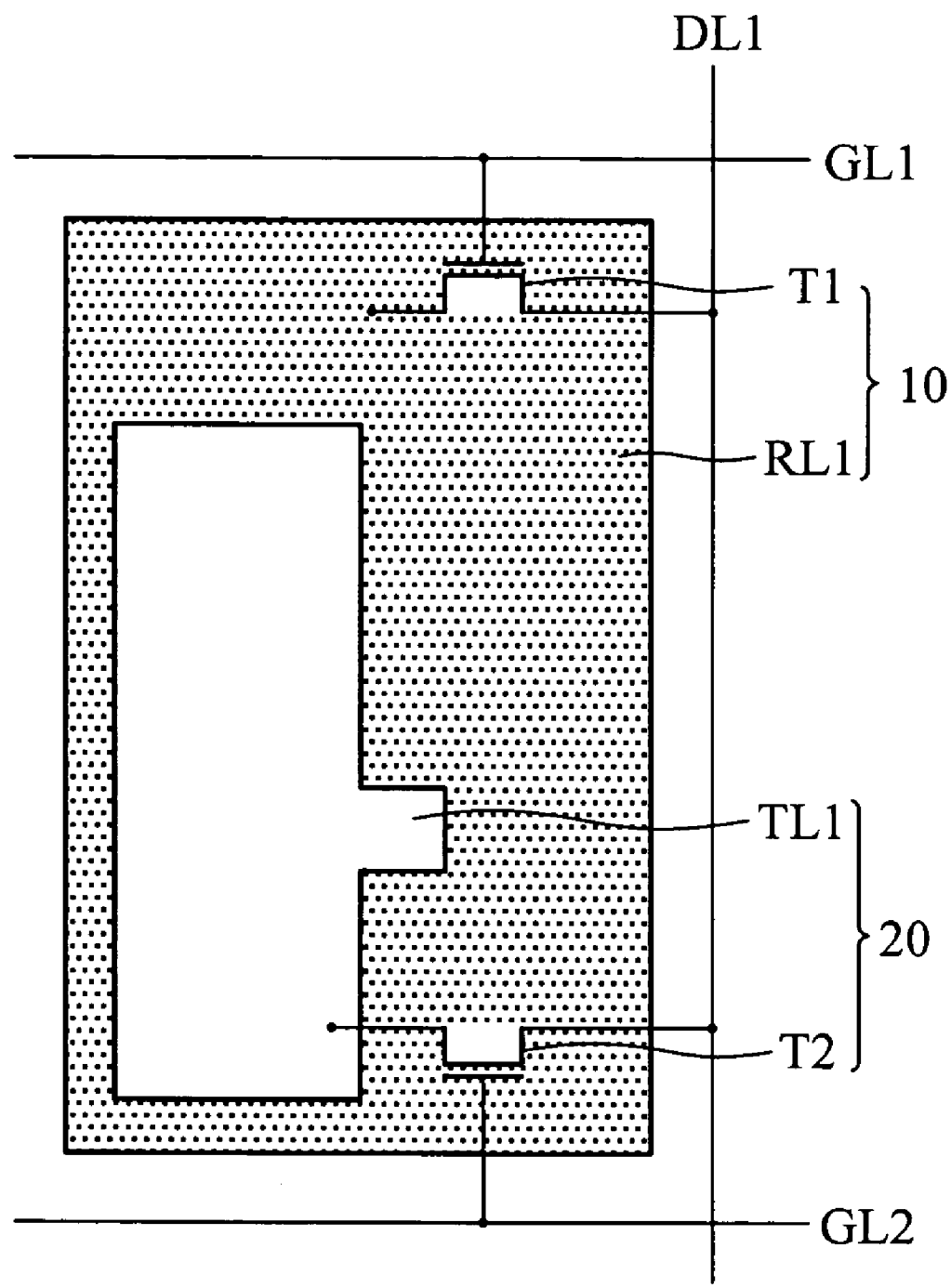
FIG. 7A is a schematic diagram showing another pixel structure of the present invention.
Figure 7B:
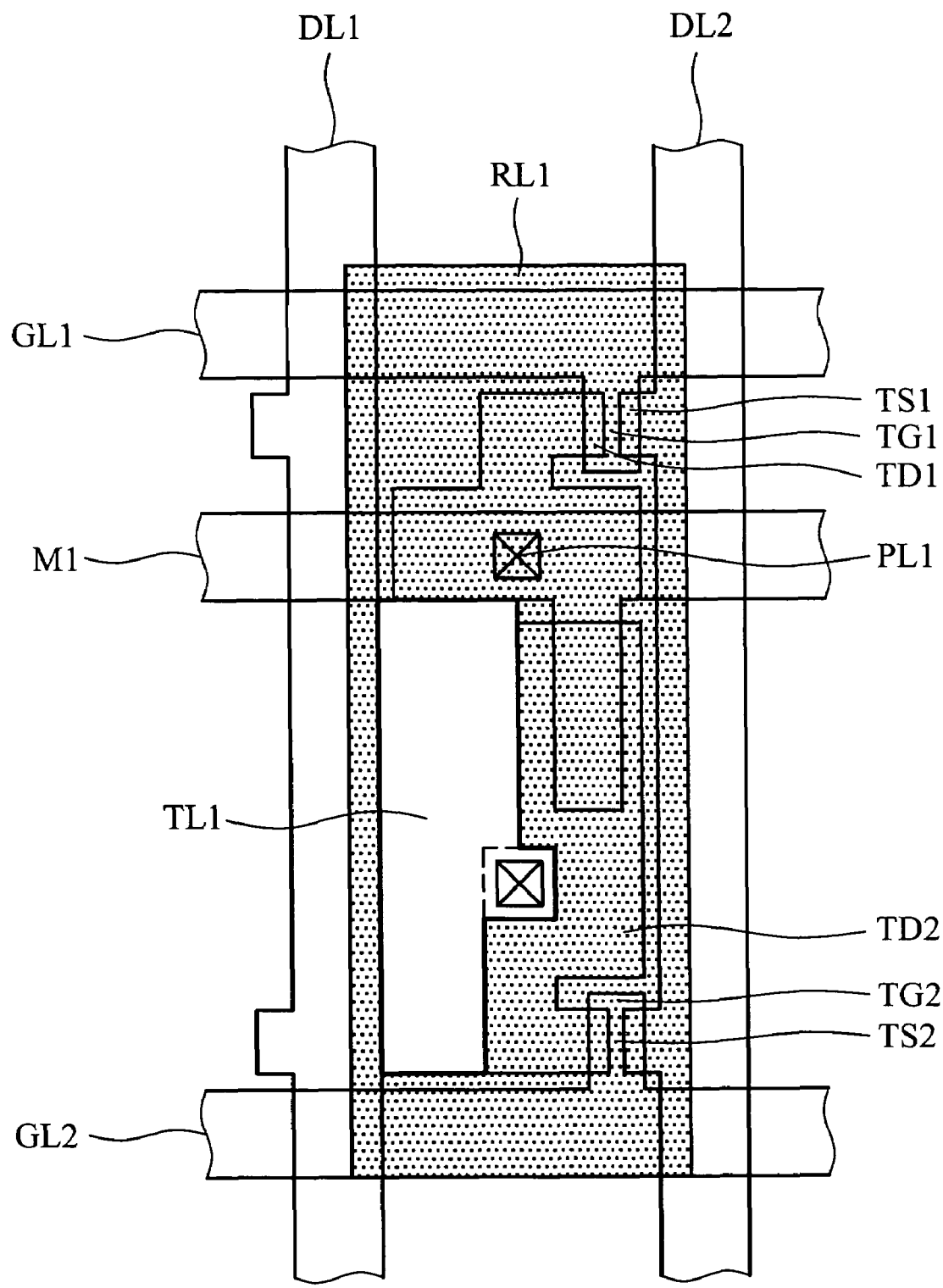
FIG. 7B is a layout of FIG. 7A.

FIGS. 7A and 7B show other configurations of the embodiment. A pixel structure having a reflective cell 10 and a transmission cell 20 is disposed between a first data line DL1 and a second data line DL2. The transistors T1 and T2 are covered by a reflective electrode RL1, disposed around a transparent electrode TL1. A metal layer M1 is disposed under a drain TD1 of the transistor T1, and extends to an underside of a drain TD2 of the transistor T2.

Figure 8A:
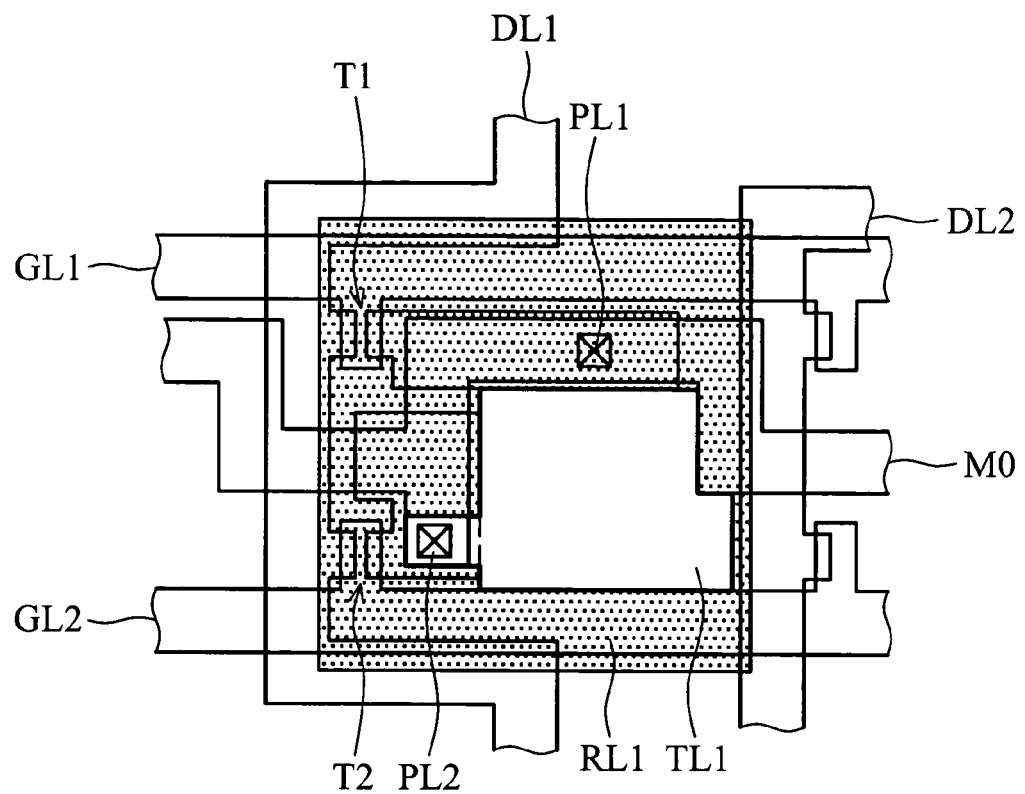
FIG. 8A shows another configuration of FIG. 6A.

FIG. 8A shows another configuration of the embodiment. A pixel structure having a reflective cell and a transmission cell is disposed between data lines DL1 and DL2, wherein the data lines are bent. The transistors T1 and T2 are covered by a reflective electrode RL1. The reflective electrode RL1 is disposed around a transparent electrode TL1. A bent metal layer M0 is disposed under the drains TD1 and TD2 of the transistors T1 and T2.

Figure 8B:
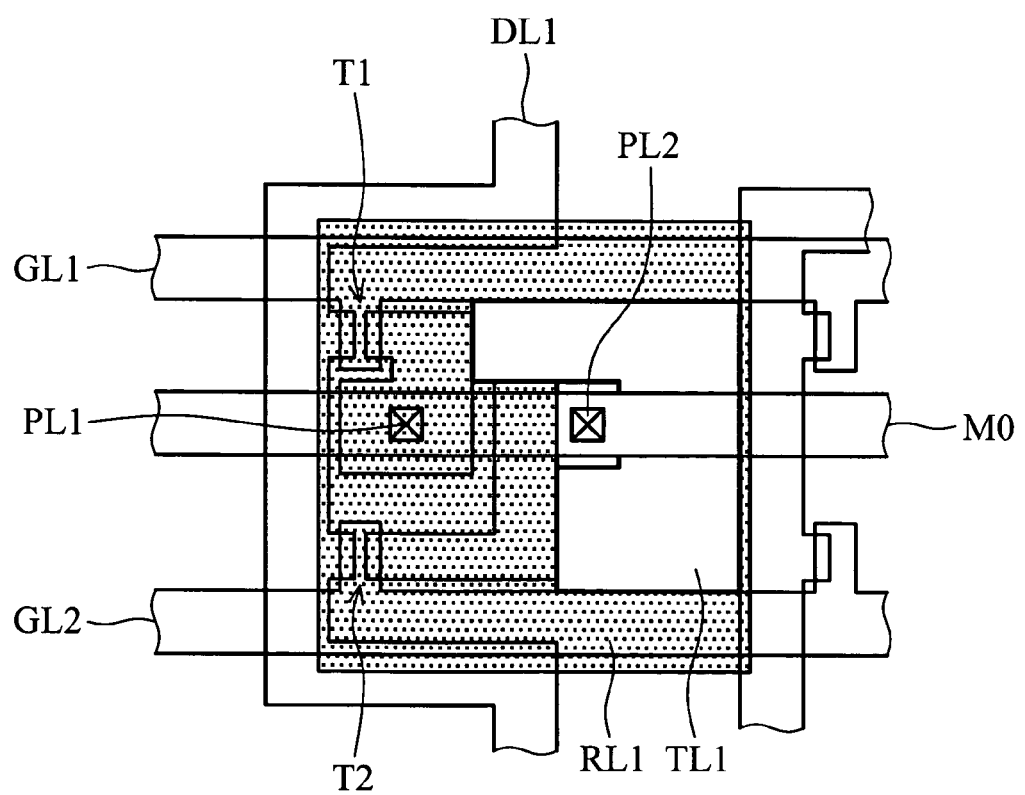
FIG. 8B shows another configuration of FIG. 6A.
Figure 9A:
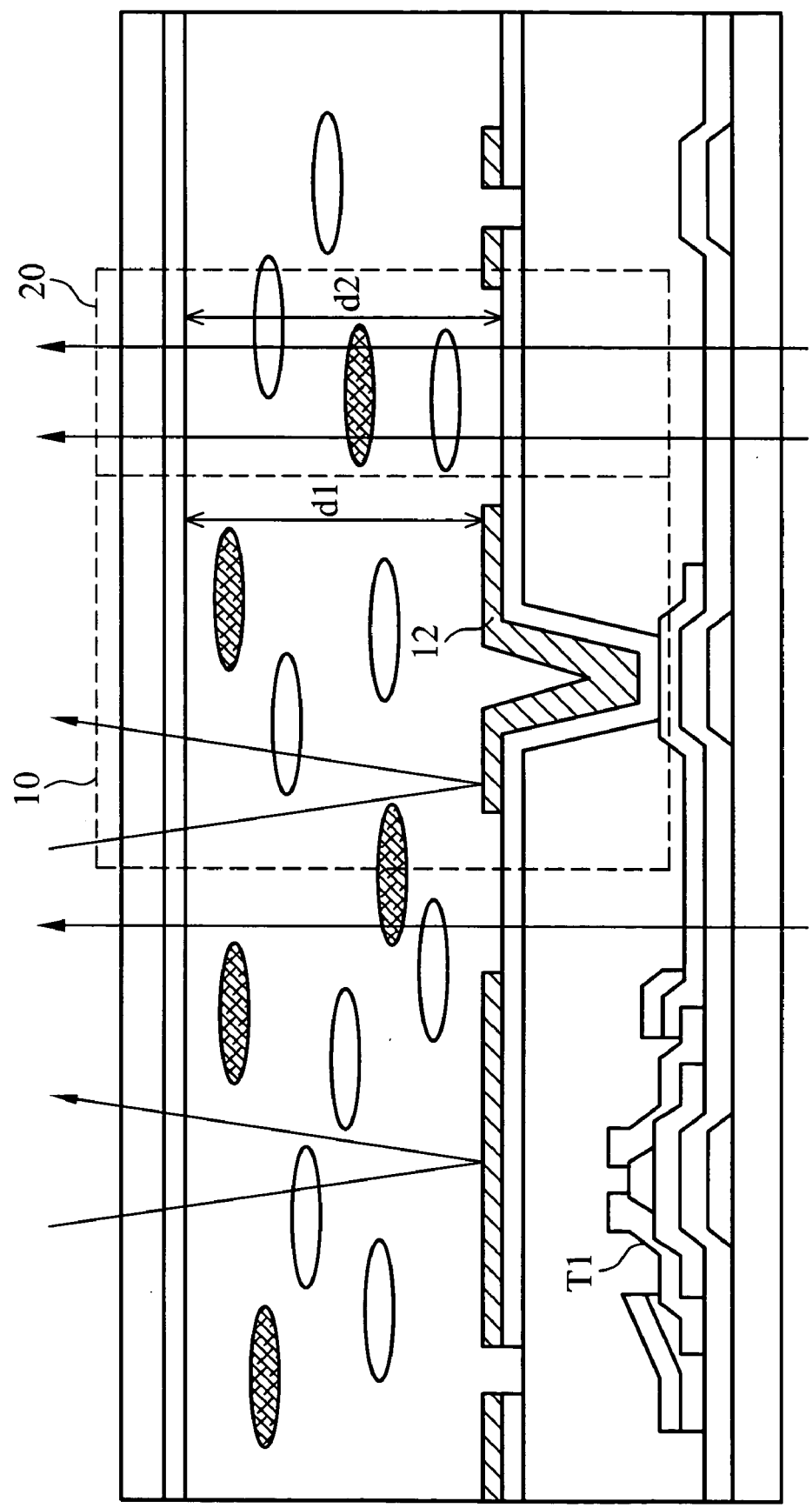
FIG. 9A is a cross-section of a conventional pixel structure.
Figure 9B:
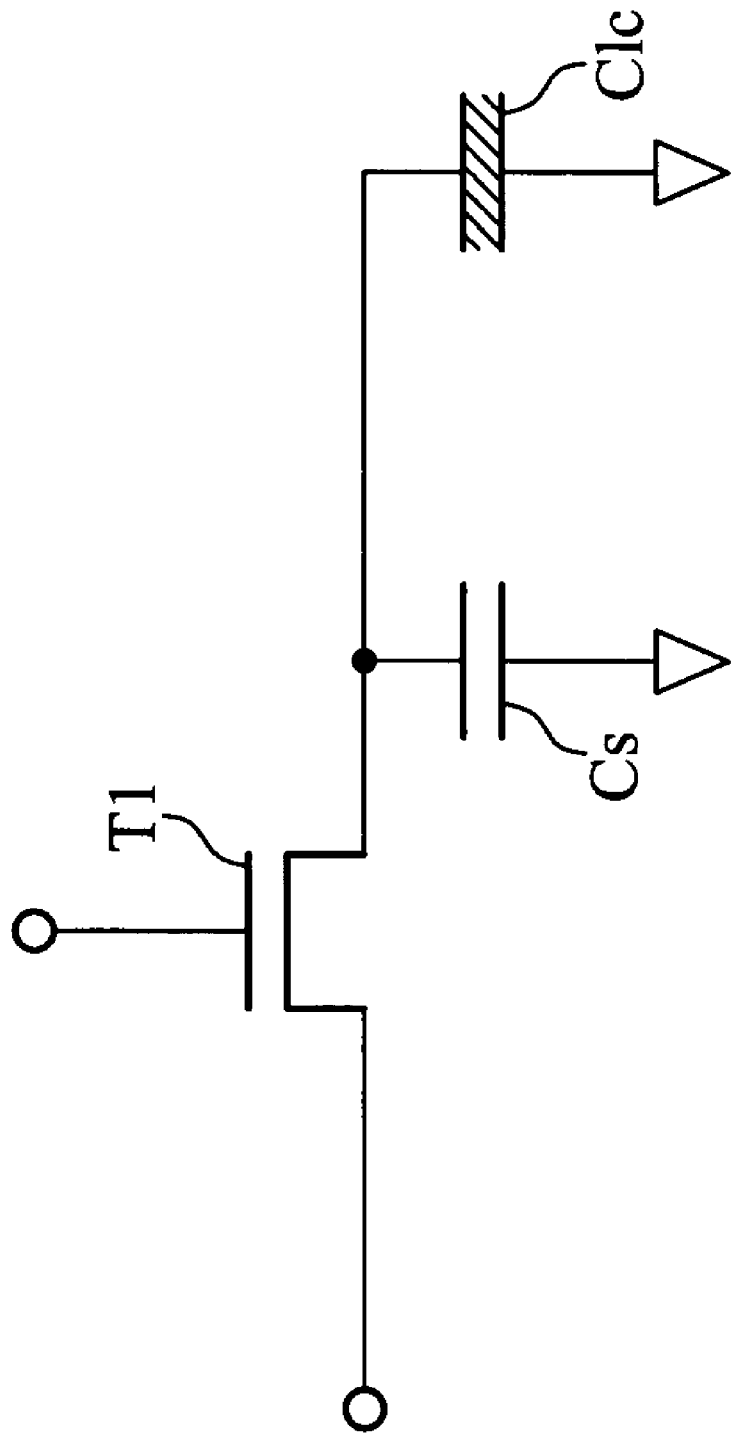
FIG. 9B is an equivalent circuit diagram showing the conventional pixel structure.

FIG. 8B shows another configuration of the embodiment. A pixel structure having a reflective cell and a transmission cell is disposed between data lines DL1 and DL2, wherein the data lines are bent. The transistors T1 and T2 are covered by a reflective electrode RL1. The reflective electrode RL1 is disposed around a transparent electrode TL1. A metal layer M0 is disposed under the drains TD1 and TD2 of the transistors T1 and T2.

In the present invention, the transistors T1 and T2 of the pixel structure control the drive voltages of the reflective cell and the transmission cell respectively, the reflection and transmission of the pixel structure are exact, such that the cell gaps do not have to adjust.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure of transflective LCD disposed between a first data line and a second data line, comprising:
    a reflective cell comprising a first transistor and a first reflective electrode, wherein the first transistor comprises a gate coupled to a scan line, a source coupled to the first data line, and a drain coupled to the first reflective electrode, and the first transistor is covered by the first reflective electrode; and
    a transmission cell comprising a second transistor and a transparent electrode, wherein the second transistor comprises a gate coupled to the scan line, a source coupled to the second data line, and a drain coupled to the transparent electrode, and the second transistor is covered by a second reflective electrode.

2. The pixel structure of transflective LCD of claim 1, wherein the second reflective electrode is a first reflective electrode of another pixel structure.

3. The pixel structure of transflective LCD of claim 1, wherein the drain of the first transistor is coupled to the first reflective electrode by a first plug, and the drain of the second transistor is coupled to the transmission electrode by a second plug.

4. The pixel structure of transflective LCD of claim 3, further comprising a first metal layer and a second metal layer, acting as storage capacitors, disposed under the first plug and the second plug respectively.

5. A pixel structure of transflective LCD disposed between a first data line and a second data line, comprising:
- a reflective cell comprising a first transistor and a first reflective electrode, wherein the first transistor comprises a gate coupled to a scan line, a source coupled to the first data line, and a drain coupled to the first electric electrode; and
- a transmission cell comprising a second transistor and a transparent electrode, wherein the second transistor comprises a gate coupled to the second line, a source coupled to the second data line, and a drain coupled to the transparent electrode, and the first transistor and the second transistor are covered by the first reflective electrode.

6. The pixel structure of transflective LCD of claim 5, wherein the drain of the first transistor is coupled to the first reflective electrode by a first plug, and the drain of the second transistor is coupled to the transparent by a second plug.

7. The pixel structure of transflective LCD of claim 6, further comprising a first metal layer and a second metal layer, acting as storage capacitors, disposed under the first plug and the second plug respectively.

8. The pixel structure of transflective LCD of claim 5, wherein the first data line and the second data line are bent, the drain of the first transistor is coupled to the first reflective electrode by a first plug, and the drain of the second transistor is coupled to the transparent by a second plug.

9. The pixel structure of transflective LCD of claim 8, further comprising a metal line disposed under the drains of the first and second transistor, acting as a storage capacitor.

10. The pixel structure of transflective LCD of claim 8, wherein the metal line is bent, and the metal line acting as a storage capacitor is disposed under the drains of the first and second transistor.

11. A pixel structure of transflective LCD disposed between a first data line and a second data line, comprising:
- a reflective cell comprising a first transistor and a first reflective electrode, wherein the first transistor comprises a gate coupled to a first scan line, a source coupled to the first data line, and a drain coupled to the first reflective electrode, and the first transistor is covered by the first reflective electrode; and
- a transmission cell comprising a second transistor and a transparent electrode, wherein the second transistor comprises a gate coupled to a second scan line, a source coupled to the first data line, and a drain coupled to the transparent electrode, and the second transistor is covered by a second reflective electrode.

12. The pixel structure of transflective LCD of claim 11, wherein the second reflective electrode is a first reflective electrode of another pixel structure.

13. The pixel structure of transflective LCD of claim 11, wherein the drain of the first transistor is coupled to the first reflective electrode by a first plug, and the drain of the second transistor is coupled to the transparent electrode by a second plug.

14. The pixel structure of transflective LCD of claim 13, further comprising a first metal layer and a second metal layer, acting as storage capacitors, disposed under the first plug and the second plug respectively.

15. A pixel structure of transflective LCD disposed between a first data line and a second data line, comprising:
- a reflective cell comprising a first transistor and a first reflective electrode, wherein the first transistor comprises a gate coupled to a scan line, a source coupled to the first data line, and a drain coupled to the first reflective electrode; and
- a transmission cell comprising a second transistor and a transparent electrode, wherein the second transistor comprises a gate coupled to a second scan line, a source coupled to the first data line, and a drain coupled to the transparent electrode, and the first and second transistor are covered by the first reflective electrode.

16. The pixel structure of transflective LCD of claim 15, wherein the drain of the first transistor is coupled to the first reflective electrode by a first plug, and the second transistor is coupled to the transparent electrode by a second plug.

17. The pixel structure of transflective LCD of claim 16, further comprising a first metal layer and a second metal layer, acting as storage capacitors, disposed under the first plug and the second plug respectively.

18. The pixel structure of transflective LCD of claim 15, wherein the first transistor and the second transistor are disposed on different sides under the transparent electrode.

19. The pixel structure of transflective LCD of claim 16, further comprising a first metal layer acting as a storage capacitor disposed under the first plug, and extending to an underside of the drain of the second transistor.

* * * * *